United States Patent [19]

Serlin et al.

[11] 4,016,128

[45] Apr. 5, 1977

[54] PREPARATION OF AQUEOUS SOLUTIONS OF QUATERNARY AMMONIUM RESINS FROM DI(TERTIARY AMINE) AND 1,4-DIHALOBUTENE-2

[75] Inventors: Irving Serlin, Springfield; Albert H. Markhart, Wilbraham, both of Mass.

[73] Assignee: Monsanto Company, St. Louis, Mo.

[22] Filed: May 23, 1975

[21] Appl. No.: 580,508

[52] U.S. Cl. .................. 260/29.6 HN; 260/29.6 H; 526/11.1; 428/514; 428/537
[51] Int. Cl.$^2$ .................. C08L 79/00; C08L 87/00
[58] Field of Search ........... 526/11.1; 260/29.6 HN, 260/29.6 H

[56] References Cited

UNITED STATES PATENTS 3,825,511   7/1974   Markhart et al. ............. 260/87.5 R Primary Examiner—Harold D. Anderson
Attorney, Agent, or Firm—R. Bruce Blance; James C. Logomasini; Edward P. Grattan

[57] ABSTRACT

The reaction of a 1,4-dihalobutene-2 and a di(tertiary amine) in aqueous medium to form a quaternary ammonium resin. The reaction is carried out with an excess of 1,4-dihalobutene-2; unreacted 1,4-dihalobutene-2 is then stripped and the resin product is stabilized by addition of an alkali metal phosphate.

8 Claims, No Drawings

PREPARATION OF AQUEOUS SOLUTIONS OF QUATERNARY AMMONIUM RESINS FROM DI(TERTIARY AMINE) AND 1,4-DIHALOBUTENE-2

FIELD OF THE INVENTION

The present invention relates to the preparation of quaternary ammonium resins and to the stabilization of such resins.

PRIOR ART

A novel class of quaternary ammonium resins is disclosed in U.S. Pat. No. 3,825,511. The resins are prepared by reaction of a di(tertiary amine) and a 1,4-dihalobutene-2 in a solvent medium and are used to impart electroconductivity to paper substrates.

The process for preparing such resins is carried out by reacting the appropriate 1,4-dihalobutene-2 with a di(tertiary amine) by adding a substantially equimolar amount of dihalobutene to the di(tertiary amine) dispersed in a suitable solvent. Water is a preferred solvent because it is cheap, non-flammable and non-toxic.

When the reactants are substantially pure, products of satisfactory molecular weight and viscosity are obtained by reaction in aqueous medium. However, commercial grades of 1,4-dihaloalkene-2 give products of low molecular weight and low viscosity which render coating of paper substrates with the resin solutions difficult to control on commercial coating machines. Indeed for commercial coating machines, resin solutions containing between 30 and 40 percent solids with a viscosity in the range of 200–400 centipoise at 25° C. are desired so that economical coating of paper substrates with between 2.4kg and 3.3kg/1000 sq. meters of substrate can be achieved to yield substrates with a conductivity of $10^{-8}$ mhos or more at 50 percent relative humidity. However, the resins obtained by reaction of commercial grades of 1,4-dihalobutenes by the process of U.S. Pat. No. 3,825,511 yield aqueous solutions containing 40 percent solids with a viscosity of 150 cps or less which declines to less than 50 cps after several months. Such low viscosities are unsuitable because the solutions are absorbed into the paper substrate and tend to drain through rather than remain on the surface to provide a coherent film of resin necessary for solvent hold-out and conductivity. Commercial grades of 1,4-dihaloalkene-2 are found to contain between 0.5 and 5 weight percent of 3,4-dihaloalkene-1 which apparently interferes with the polymerization. A need therefore exists for a process for preparing quaternary ammonium resin solutions by reaction of a commercial grade of 1,4-dihalobutene-2 and a di(tertiary amine) in aqueous medium to provide resin solutions of high viscosity. A need further exists for a process for preparing such quaternary ammonium resin solutions and stabilizing them so that their viscosity and pH do not decline with age.

SUMMARY OF THE INVENTION

The needs are fulfilled by the present invention which provides an improved process for preparing an aqueous solution of quaternary ammonium resin by the reaction of a di(tertiary amine) and a 1,4-dihalobutene-2 wherein the di(tertiary amine) is reacted with between 1 and 10 mol percent excess of 1,4-dihalobutene-2, the concentration of reactants being selected to provide a resin content in the range of 65 to 90 weight percent of the aqueous solution, and wherein the reaction product is steam distilled under reduced pressure to remove unreacted dihalobutene. The quaternary ammonium resin solutions are then stabilized by addition of a buffer solution to adjust the pH to the range of 6.5 to 7.5.

PREFERRED EMBODIMENTS

In the process for preparing quaternary ammonium resins, a di(tertiary amine) is reacted with a 1,4-dihalobutene-2.

The di(tertiary amines) are selected from the group comprising:

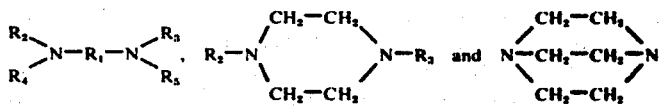

wherein $R_1$ is a divalent radical selected from the group consisting of phenylene, xylylene and saturated and unsaturated alkylene radicals of 2 to 6 carbon atoms optionally substituted with methyl and hydroxyl radicals and $R_2$, $R_3$, $R_4$ and $R_5$ are radicals selected from the group consisting of $C_1$ to $C_4$ alkyl and $C_1$ to $C_4$ hydroxyalkyl. Examples of such di(tertiary amines) include N,N,N',N'-tetramethylethylenediamine, N,N'-dimethyl piperazine, triethylenediamine, N,N,N',N'-tetramethyl hexylenediamine, N,N,N',N'-tetrabutylethylenediamine, N,N,N',N'-tetrakis(hydroxyethyl)ethylenediamine, 1,3-bis(dimethylamino)-2-hydroxypropane, and N,N,N',N'-tetramethyl p-xylylenediamine.

The 1,4-dihalobutene-2 is 1,4-dichlorobutene-2 or 1,4-dibromobutene-2. Commercial grades of 1,4-dihalobutene-2 contain between 0.5 and 5 weight percent of 3,4-dihalobutene-1 which tends to depress the molecular weight of the quaternary ammonium resin and the viscosity of its aqueous solutions. The 3,4-dihalobutene-1 may be removed by careful fractional distillation, which adds to the cost of the raw materials and affects the economics adversely. However, when the 3,4-dihalobutene-1 has been removed, the purified grades of 1,4-dihalobutene-2 react readily with di(tertiary amine) to give quaternary ammonium resin of substantial molecular weight, demonstrating that the low molecular weight of the resins prepared from commercial grades of the reactants is primarily associated with the presence of 3,4-dihalobutene-1 in the 1,4-dihalobutene-2 and not with hydrolysis of the 1,4-dihalobutene-2 which can occur in alkaline solutions.

In the process of the present invention, however, those commercial grades of 1,4-dihalobutene-2 containing between 0.5 and 5 weight percent of 3,4-dihalobutene-1 are used without the costly step of fractional distillation of the alkene. When the commercial grade of 1,4-dihalobutene-2 is added to an aqueous dispersion of the di(tertiary amine) to provide an excess of 1,4-dihalobutene-2 between 1 and 10 mol percent over the di(tertiary amine), the depressing effect of the 3,4-dihalobutene-1 is overcome. The excess is calculated on the assumption that the 1,4-dihalobutene-2 and the di(tertiary amine) are 100 percent pure. The quantities of reactants are selected to provide a solution of quaternary ammonium resin containing between 65 and 90 weight percent of resin. The reaction is carried out by adding the dihalobutene continuously to the di(tertiary amine) or to an aqueous dispersion or solution of di(tertiary amine) at a temperature in the range of 25° to 100° C., the rate of addition being controlled to maintain the reaction temperature at the desired level. Water is added continuously or incrementally during the reaction to maintain a stirrable viscosity. At lower temperatures in the range of 25° to 100° C., the reaction tends to be sluggish. At higher temperatures, excessive color forms in the reaction medium. Consequently, reaction at a temperature below 70° C. is preferred, and more preferably in the range of 45° to 60° C. Vigorous stirring aids dispersion, increases the rate of polymerization and decreases the amount of side reaction. Stirring is continued after the addition of dihalobutene is complete until the second phase disappears or is reduced to a slight haziness in the resulting aqueous solution of the quaternary ammonium resin. Usually 2 to 4 hours is required for this. The aqueous solution is then steam-stripped preferably at a temperature below 70° C. and at a pressure in the range of 20 to 200 mm. Hg to remove unreacted 1,4-dihalobutene-2, 3,4-dihalobutene-1 and color bodies which form during the reaction of the di(tertiary amine) and dihalobutene. The stripping step is carried out until the condensate is clear and colorless. The solution is then diluted with water to the desired solids content and is cooled to room temperature.

While between 1 and 10 mol percent excess 1,4-dihalobutene-2 is conveniently used in the reaction with di(tertiary amine), it is preferred to use between 2 and 4 mol percent excess to overcome the depressing effect of 3,4-dihalobutene-1 on the molecular weight without the need of a lengthy steam distillation to remove the unreacted material at the end of the reaction. The effectiveness of such an excess is surprising in view of the reactive allyl chloride present in the 3,4-isomer and the anticipated chain stopped effect of the 3,4-isomer and of the excess 1,4-isomer.

A feature of the invention resides in the selection of quantities of reactants to provide a solution of quaternary ammonium resin containing between 65 and 90 weight percent of resin prior to the steam-stripping step. At concentrations less than 65 weight percent, the molecular weight of the resin does not build up adequately so that upon dilution of the resin solution with water to a concentration of 30 to 40 percent the viscosity drops to values below 100 cps, and is unsatisfactory for surface coating of cellulose substrates at economical coating weights suitable for electrographic conductive substrates. Moreover with low concentrations of the reactants, even when there is an excess of 1,4-dihalobutene-2, the final pH of the reaction mixture is excessively alkaline and the viscosity of the solution declines rather rapidly. At the higher concentrations in the range of 65 to 90 weight percent, the viscosity may increase during the polymerization to a level which hinders stirring of the reaction mixture and minor increases in the water content may be required to reduce the viscosity to a stirrable level.

Another feature of the invention is provided by the step of adjustment of the pH of the resin solution to the range of 6.5 to 7.5 with a buffer solution. Any solution which is an effective buffer in this pH range may be used for pH adjustment, for example solutions of water soluble alkali metal acid phosphates, solutions of 2,2-bis(hydroxymethyl)-2,2',2''-nitrilotriethanol and hydrochloric acid, solutions of potassium dihydrogen phosphate and borax, solutions of N-tris(hydroxymethyl)methyl-2-aminoethanesulfonic acid and sodium hydroxide, solutions of triethanolamine and hydrogen chloride, solutions of diethylbarbiturate and hydrochloric acid. Solutions containing sodium or potassium dihydrogen phosphate, or disodium or dipotassium hydrogenphosphate or mixtures of these phosphates are preferred. The buffers are prepared in dilute solution and may be added to the quaternary ammonium resin solutions at the dilution step after steam-stripping. At this stage the pH of the quaternary ammonium resin solution is in the range of 7 to 8 after the excess of 1,4-dihalobutene-2 has been stripped off. When the resin solution is prepared at low concentration of reactants, the already low viscosity of the solution, for some unexplained reason, drops further below acceptable values for production of satisfactory electroconductive coatings on paper substrates. However buffering the solution prevents further drop in the viscosity and can even cause a slow but steady increase. When the resin solution is prepared at high solids, the initial pH of about 7.5 drifts down to 2.0 and less so that the strongly acid solution becomes unfit for paper coating and other applications. This drift in pH contrasts with the stability of the pH of quaternary ammonium resins prepared from reaction of substantially equimolar amounts of purified 1,4-dihalobutene-2 and di(tertiary amine) and is surprising in view of the steam-stripping to remove excess dihalobutene. The buffering not only stabilizes the pH of the solution, but also can cause an increase in viscosity of as much as three-fold over a period of 8 months at room temperature thus further improving the coatability of the resin solution at low coating weights.

The amount of buffer added to the aqueous quaternary ammonium resin is sufficient to give stability for a reasonable storage time but not so excessive that other properties are impaired as can be readily determined by the skilled worker. In particular, in the use of the resin to impart conductivity to paper substrates in electrographic applications, the amount of buffer is restricted so that the solvent hold-out is not impaired and so that variation is conductivity with relative humidity is not excessive. For example, when the buffer is an aqueous solution of an alkali metal acid phosphate, as little as 0.1 percent based on the weight of a 40 weight percent resin solution imparts some improvement in stability, but for adequate storage stability i.e., for storage stability of several months at room temperature, between 0.4 and 2 percent is preferred.

The following examples are set forth in illustration of this invention and should not be construed as limitations thereof. Unless otherwise indicated, all parts and percentages are given in terms of parts by weight. Add-on is the increase in weight of paper by addition of resin and adjuncts and is expressed as kilograms per 1000 square meters.

Solvent hold-out is determined by the tentative test procedure developed by Tappi CA1120 on paper conditioned at 50 percent relative humidity and 22° C. for 24 hours. The two test solutions contain 4g. of Cyanamid Calco Oil Blue W dye per liter, respectively, of toluene and Isopar G, a saturated hydrocarbon solvent supplied by Humble Oil Company.

Surface resistivity is determined by a series of experiments. In each of the series of experiments, a sheet of bleached sulfite base paper of basis weight 57kg/1000 sq.m., sized on one side, is coated on the wire or felt side with a layer of an aqueous solution of electroconductive resin, the concentration of which is adjusted to give a viscosity in the range of 50 to 500 cps. and an add-on in the range of 0.8kg to 4.9kg/1000 sq.m. Coating is effected with the wire wound rod appropriate to the desired add-on. The coating is dried on a drum drier at 75° C. for a period of 3 minutes. The coated paper is weighed to determine the add-on.

Test pieces are cut from the coated paper. They are conditioned in air for at least 24 hours at 25° C. and the requisite relative humidity. They are tested for surface resistivity by a procedure substantially like that described in Standard Methods of Test for Insulation Resistance of Electrical Insulating Materials, ASTM designation D-257-66. A Keithley Model 6105 Resistivity Adapter coupled with a Cenco High Voltage DC Power supply providing a regulated DC voltage accurate to ±1 percent is used to determine the resistivity. The excitation voltage is 200 volts. Paper samples are conditioned at the required humidity level for at least 24 hours before surface resistivities are determined. Duplicate determinations are made.

EXAMPLES 1–10

A series of examples are run to show the effect of variation in stoichiometry on the viscosity of the resin solution. In examples 1–7, 1,3-bis(dimethylamino)-2-hydroxypropane [DMAHP] in water is reacted with a commercial grade 1,4-dichlorobutene-2 [DCB] by adding the dichlorobutene in one increment to the diamine and stirring the mixture vigorously for 1 hour, allowing the temperature to rise to 50° C. and then maintaining the solution at 45° C. for 6 hours. In examples 8–10, the DCB is stirred in continuously at a uniform rate for a period of 30 minutes to the 1,3-bis(dimethylamino)-2-hydroxypropane containing sufficient water for a 70 percent solution at the end of the addition. The reaction is carried out at 50–60° C. Heating and stirring are continued for 30 minutes or until the pH drops below 7. 392 Parts of water are added and the hazy solution is vacuum stripped at 64–70 mm Hg and 50°–55° C. until the solution is clear. It is then cooled and the buffersolution of disodium hydrogen phosphate is added. The data are presented in Table I and indicate that a DCB excess around 2 mol percent gives higher viscosity products.

TABLE I
THE EFFECT OF STOICHIOMETRY ON THE VISCOSITY OF RESIN SOLUTIONS

| EXAMPLE | 1 | 2 | 3 | 4 | 5 | 6 | 7 | 8 | 9 | 10 |
|---|---|---|---|---|---|---|---|---|---|---|
| Water, pbw | 550 | 550 | 550 | 550 | 550 | 550 | 550 | 193 | 193 | 193 |
| DMAHP | 244 | 242 | 241 | 241 | 241 | 240 | 238 | 247 | 247 | 247 |
| DCB | 206 | 208 | 209 | 209 | 209 | 210 | 212 | 219 | 224 | 226 |
| WATER | — | — | — | — | — | — | — | 392 | 392 | 392 |
| Na$_2$HPO$_4$2H$_2$O | — | — | — | — | — | — | — | 12.2 | 12.2 | 12.2 |
| H$_2$O | — | — | — | — | — | — | — | 127 | 127 | 127 |
| PERCENT EXCESS DCB | −1.0 | 0 | 1.2 | 2.0 | 2.0 | 4.0 | 6.0 | 3.5 | 5.8 | 6.8 |
| SOLIDS, PERCENT | 45 | 45 | 45 | 45 | 45 | 45 | 45 | 40 | 40 | 40 |
| VISCOSITY cps | 188 | 264 | 688 | 1730 | 495 | 410 | 88 | 228 | 210 | 183 |

EXAMPLES 11–14

These examples show the effect of concentration of the reactants on the viscosity of the resin product solution. The resins are prepared by the procedures of Example 8 by reaction of 1,4-dichlorobutene-2 and 1,3-bis(dimethylamino)-2-hydroxypropane.

TABLE II
EFFECT OF CONCENTRATION OF REACTANTS

| EXAMPLE | 11 | 12 | 13 | 14 | 15 |
|---|---|---|---|---|---|
| MOL PERCENT EXCESS DCB REACTION | 0 | 3.7 | 2 | 2 | 2 |
| SOLIDS PERCENT FINAL | 70 | 44 | 70 | 80 | 90 |
| SOLIDS PERCENT | 41.8 | 41.2 | 40 | 41.4 | 40 |
| pH | 7.9 | 8.85 | 7.20 | — | 6.88 |
| VISCOSITY, cps | 115 | 81 | 203 | 875 | 540 |

Example 11 prepared at high concentration of reactants without excess 1,4-dichlorobutene-2 and Example 12 prepared at low concentration of reactants but with excess 1,4-dichlorobutene-2 yield final solutions which are alkaline and low in viscosity. Examples 13 and 14 with reaction solids in the range 70–80 percent yield final solutions with viscosities above 150 cps without presenting problems of excessive thickening during the polymerization reaction. Example 15 with reactant concentration adjusted for 90 percent solids, becomes so viscous during the reaction that the reaction mass is difficult to stir and uniform dispersion of the 1,4-dichlorobutene-2 is difficult to maintain.

EXAMPLES 16–22

These examples set forth the effect of aging of a series of resin solutions prepared from the reaction of 1,4-dichlorobutene-2 and 1,3-bis(dimethylamino)-2-hydroxypropane. The series is set forth in Table III and aging data are set forth in Table IV.

TABLE III

SERIES OF RESIN SOLUTIONS FOR AGING TESTS

| EXAMPLE | 16 | 17 | 18 | 19 | 20 | 21 | 22 |
|---|---|---|---|---|---|---|---|
| MOL PERCENT EXCESS DCB REACTION | 0 | 0 | 0 | 0 | 0 | 2 | 2 |
| SOLIDS PERCENT FINAL | 70 | 70 | 70 | 35 | 37 | 70 | 70 |
| SOLIDS PERCENT BUFFER, PERCENT | 42.2 | 42.0 | 41.8 | 41.7 | 41 | 40 | 40 |
| $Na_2HPO_4$—$2H_2O$ | — | — | 1 | — | — | — | 1 |
| $NaH_2PO_4$ | — | 1 | — | — | — | — | — |
| pH | 7.7 | 6.9 | 7.9 | 8.2 | 8.1 | 7.3 | 7.3 |
| VISCOSITY, cps | 119 | 104 | 115 | 146 | 39 | 440 | 440 |

TABLE IV

EFFECT OF AGING AT 25° C. ON VISCOSITY OF RESIN SOLUTIONS

| EXAMPLE | 16 | 17 | 18 | 19 | 20 | 21 | 22 |
|---|---|---|---|---|---|---|---|
| VISCOSITY cps/pH Day: | | | | | | | |
| 0 | 119/7.7 | 104/6.9 | 115/7.9 | — | — | 440/7.3 | 440/7.3 |
| 1 | — | — | — | 146/8.2 | 39/8.1 | — | — |
| 10 | 122/7.1 | 114/6.3 | 116/7.4 | — | — | 430/3.4 | 485/7.3 |
| 28 | 110/7.7 | 115/6.8 | 110/7.8 | — | — | — | — |
| 98 | 104/7.6 | 123/6.6 | 98/7.7 | — | — | — | — |
| 112 | — | — | — | — | — | 456/2.3 | 584/7.0 |
| 120 | — | — | — | 96/8.2 | 32/8.5 | — | — |

The data show that the resin solutions 16–20 prepared from stoichiometric quantities of 1,4-dichlorobutene-2 and 1,3-bis(dimethylamino)-2-hydroxypropane are low in viscosity which decreases upon aging unless it is stabilized with an acid buffer. In contrast, resin solution 21 prepared by reaction of 2 mol percent excess 1,4-dichlorobutene-2 is higher in viscosity but the pH of the solution drops rapidly. Buffering of resin solution 22 stabilizes the pH and simultaneously promotes an increase in viscosity with age. Thus the data show that resin solutions prepared at low reaction solids, are alkaline in pH and show a drop in viscosity upon aging. In contrast, resin solutions prepared at high reaction solids and with X's DCB are stable in viscosity but the pH drops quickly. Buffering causes a surprising increase in viscosity and at the same time stabilizes the pH of the more concentrated resin solution.

The resin solutions of Examples 8–10 and 16 were evaluated as electroconductive resins for paper substrates to be used in electrographic applications. The presence of buffer in examples 8–10 cause no impairment of properties versus example 16 without buffer.

TABLE V

CONDUCTIVE RESIN PROPERTIES

| EXAMPLE | 8 | 9 | 10 | 16 |
|---|---|---|---|---|
| MOL PERCENT EXCESS DCB | 3.5 | 5.8 | 8.7 | 0 |
| BROOKFIELD 25° C 40 % solids; cps | 228 | 210 | 183 | 146 |
| COATING WEIGHT Kg/1000 sq. m. | 2.6 | 2.8 | 2.8 | 2.0 |
| PERCENT PENETRATION (HOLD-OUT) Toluene: | 20 | 20 | 25 | 15 |

TABLE V-continued

CONDUCTIVE RESIN PROPERTIES

| EXAMPLE | 8 | 9 | 10 | 16 |
|---|---|---|---|---|
| Isopar G: SURFACE RESISTIVITY ohms per square, 20 % RH | $4.5 \times 10^8$ | $4.3 \times 10^8$ | $7.1 \times 10^8$ | $1.3 \times 10^9$ |

We claim:

1. A process for preparing an aqueous solution of a quaternary ammonium resin which comprises:
   A. reacting a di(tertiary amine) with from 1 to 10 mol percent excess of a 1,4-dihalobutene-2 containing from 0.5 to 5 weight percent of a 3,4-dihalobutene-1, in aqueous medium to provide a resin content in the range of 65 to 90 weight percent,
   B. steam distilling until the condensate is clear and colorless, and
   C. adding a stabilizing amount of a buffer solution to maintain the pH of the resin solution in the range of 6.5 to 7.5.

2. The process of claim 1 wherein the excess of 1,4-dihalobutene-2 is from 2 to 4 mol percent.

3. The process of claim 1 wherein the di(tertiary amine) is selected from the group consisting of:

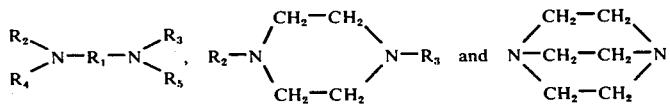

wherein $R_1$ is a divalent radical selected from the group consisting of phenylene, xylylene, alkylene and alkenylene or methyl or hydroxyl substituted derivatives thereof and $R_2$, $R_3$, $R_4$ and $R_5$ are radicals selected from the group consisting of $C_1$ to $C_4$ alkyl and $C_1$ to $C_4$ hydroxyalkyl.

4. The process of claim 1 wherein the di(tertiary amine) is selected from the group consisting of triethylenediamine and 1,3-bis(dimethylamino)-2-hydroxypropane.

5. The process of claim 1 wherein the 1,4-dihalobutene-2 is 1,4-dichlorobutene-2.

6. The process of claim 1 wherein the buffer solution comprises at least one water soluble acid phosphate.

7. The process of claim 1 wherein the amount of buffer added to the resin solution is in the range of 0.5 to 2 weight percent of the resin solution.

8. The process of claim 1 wherein the reaction step and the steam distillation are carried out at temperatures below 70° C.

* * * * *